United States Patent Office 3,535,045
Patented Oct. 20, 1970

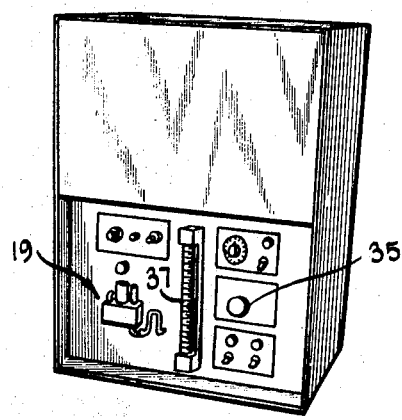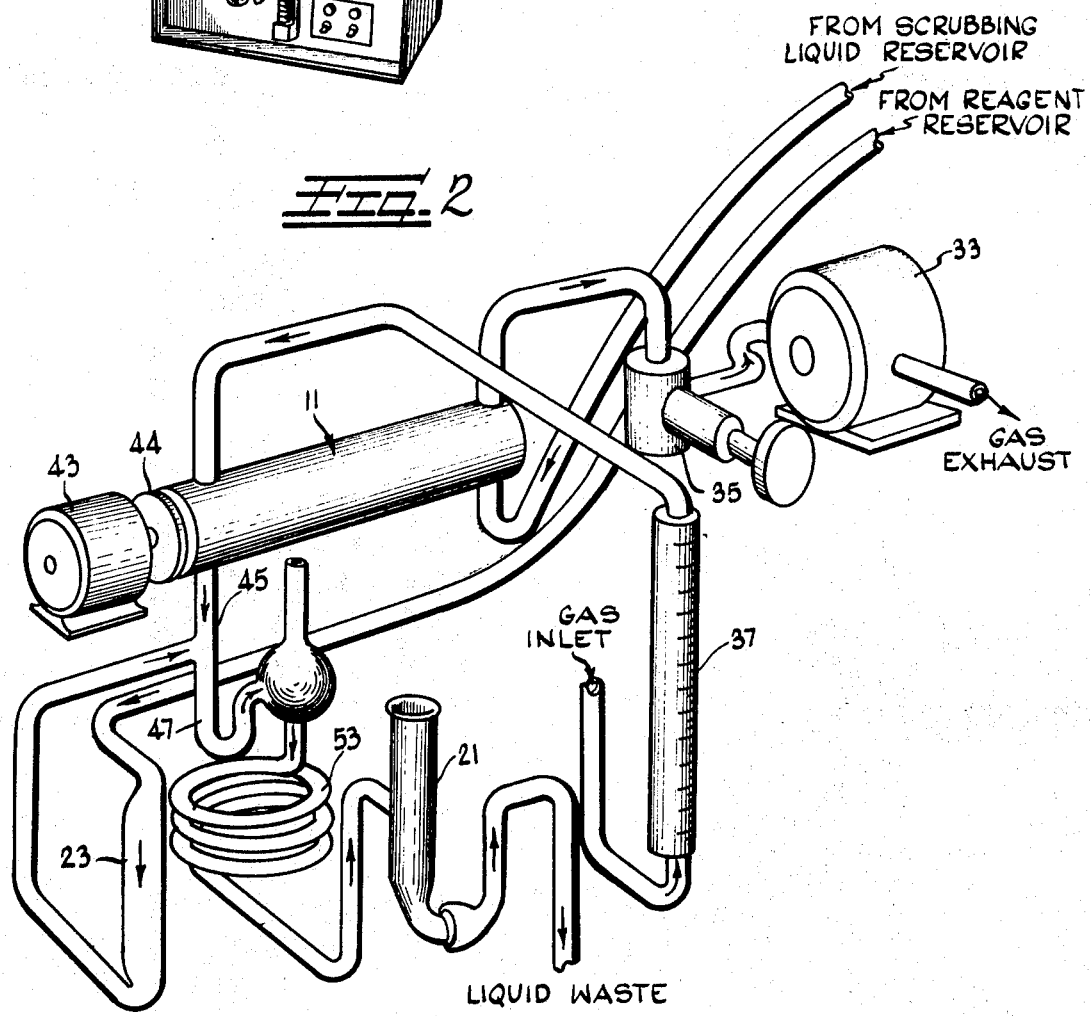

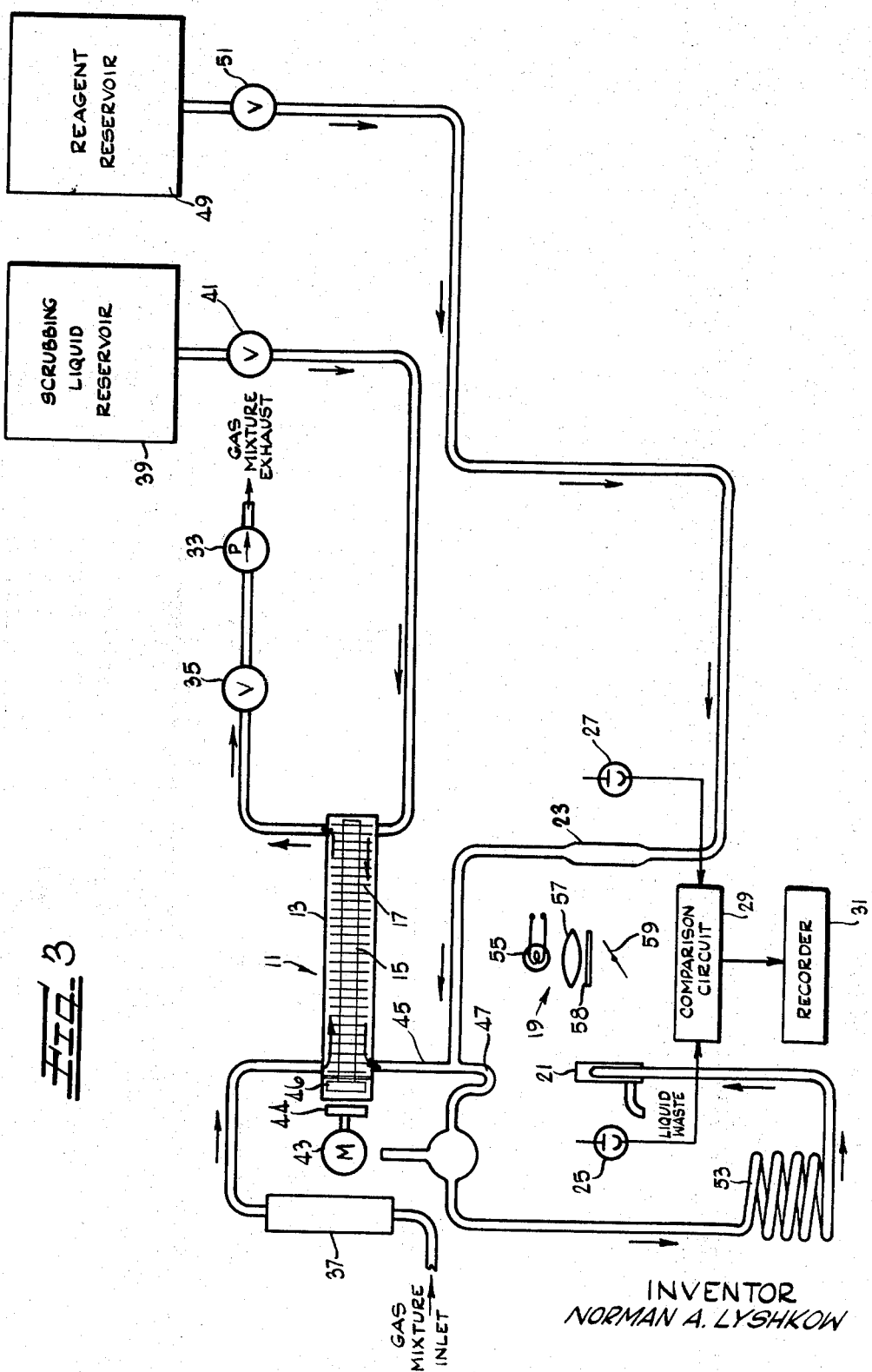

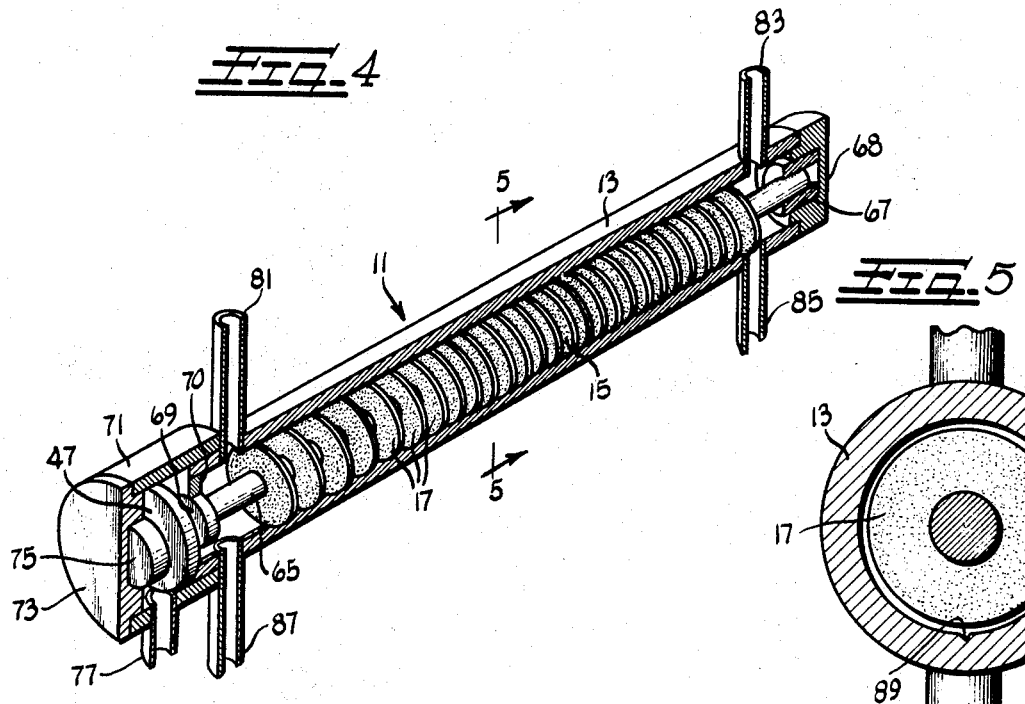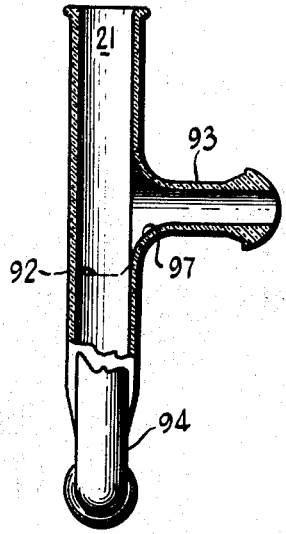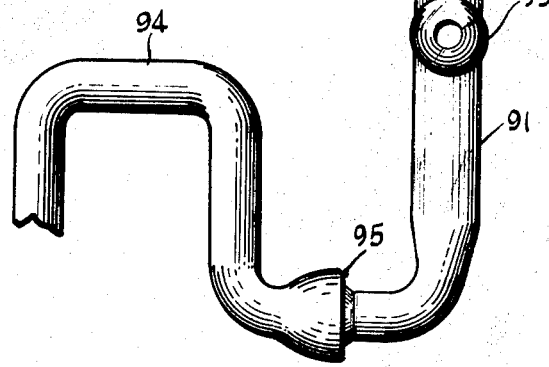

3,535,045
SYSTEM FOR ANALYSIS OF GASES IN
TRACE AMOUNTS
Norman A. Lyshkow, Chicago, Ill., assignor to Wilkens-Anderson Company, Chicago, Ill., a corporation of Illinois
Original application May 19, 1967, Ser. No. 639,888. Divided and this application June 17, 1969, Ser. No. 840,112
Int. Cl. G01j 3/46, 3/48; G01n 21/06
U.S. Cl. 356—181                                3 Claims

ABSTRACT OF THE DISCLOSURE

A system for analyzing a mixture of gases to determine the concentration of a component gas. A sample of the mixture of gases is introduced into a gas-liquid contacting means having a particular structure which effects substantially complete removal of the component gas from the mixture by dissolution in a scrubbing liquid. The sample with its dissolved component gas is introduced into a test chamber having a particular structure which minimizes intermixing of the liquid sample with previously-introduced liquid. The liquid sample is subjected to bursts of wave energy at a preselected frequency, with alternate bursts being directed to a second chamber containing a reference liquid. After impingement on the respective liquids, the bursts are received by photoresistive cells. The recovery time of the cells is so related to the burst frequency that the resistance of the cells is substantially nonfluctuating and proportional to the average burst energy received by the cells. The resistances of the cells are compared to provide an analysis of the component gas.

BACKGROUND OF THE INVENTION

The present invention relates generally to instruments for chemical analysis. More particularly, it relates to a system and apparatus in which a gas mixture is continuously or semicontinuously sampled and analyzed for a component gas.

This application is a divisional application, of application Ser. No. 639,888, filed May 19, 1967, now abandoned.

Analysis of gas mixtures, which at one time was conducted manually, has in recent years been automated to some degree. Continuous automatic analysis equipment and systems which have been developed have been particularly useful in applications where the gas composition fluctuates with time. Examples of such applications are analysis of flue gas, and, especially recently, analysis of air for trace amounts of industrial, residential and vehicular waste gases.

The analysis of air is one in which continuous automatic operation without supervision over a long period of time is especially desirable. In order to properly monitor the composition of the atmosphere and detect particular sources of waste gases, it is necessary to sample at numerous locations which may be widely separated from each other. As a consequence, it is costly to frequently inspect and attend to analysis equipment at all sampling locations. A desirable schedule would require inspection only about every few days, or, preferably, only every week or even longer.

In order to accomplish minimal inspection and maintenance, an analysis system must have a high degree of reliability and accuracy. At the same time, the cost of such a system must be minimized because of the potentially large number of sampling locations. A complicating factor in attaining high accuracy is the low concentrations in which waste gases are normally present in the atmosphere. The analysis system should be capable of accurately and consistently detecting and measuring concentrations of waste gas as low as 2.5 parts per billion parts of air (as is conventional in the art, reference to percentages or parts herein will always be in terms of gas volume). Nearly always, the concentration will be below about one percent.

The accuracy and reliability of such analysis systems is further complicated by the tendency for "drift" in the analytical system. Almost universally, the analytical method used in automated instruments involves a comparison of a test sample with a standard having known composition, e.g., colorimetric analysis. Any change, or drift, in the comparison system will result in an erroneous reading. Since unattended operation over a period of at least several days is sought, the drift must not be significant over that period of time.

Still another complicating factor in analysis of air for waste gases is the necessity to accurately correlate successive analytical determinations with the time that the sample was taken. It is sometimes necessary to know with exactitude the hour and minute at which a change in concentration of the waste gas took place. Accordingly, it is necessary that each sample be separated, so far as practical, from preceding and succeeding samples. At the same time, samples should be taken as frequently as dictated by the desired correlation with time, e.g., at one minute intervals.

In the drawing:

FIG. 1 is a perspective view of an embodiment of gas analysis system embodying the features of the present invention, enclosed in a suitable case;

FIG. 2 is a fragmentary perspective view of the gas- and liquid-conducting elements of the gas analysis system showing their relative vertical positions;

FIG. 3 is a schematic flow diagram of the gas analysis system;

FIG. 4 is a sectional perspective view of the gas-liquid contact means of FIGS. 2 and 3;

FIG. 5 is a cross sectional view taken along line 5—5 of FIG. 4 of the gas-liquid contacting means;

FIG. 6 is a fragmentary elevation of the test chamber of FIGS. 2 and 3; and

FIG. 7 is a fragmentary side view of the test chamber of FIG. 6, partly in section.

In accordance with the present invention, and with reference to FIG. 3 of the drawing, a sample of a mixture of gases is introduced into a gas-liquid contacting means, or scrubber 11. A scrubbing liquid, in which the component gas is soluble, is also introduced into the scrubber. The scrubber, the structure of which will be more completely described hereinafter, comprises a housing 13 with a rotor 15 disposed therein. The rotor includes a disc 17 which dips into the scrubbing liquid held in the bottom of the housing. A component gas which is present in the mixture of gases at a concentration of less than about one percent is substantially completely removed from the mixture of gases and dissolved in the scrubbing liquid (e.g., more than 90 percent of the component gas is removed.)

The liquid with the component gas dissolved therein (hereinafter called the liquid sample) is conducted to a comparison system 19 having a test chamber 21. The construction of the test chamber, which will hereinafter also be more completely described, is such that the liquid sample is floated atop previously-introduced liquid so as to minimize intermixing with the previously-introduced liquid. In the test chamber 21, the liquid sample is subjected to bursts of wave energy, e.g., light, with alternate bursts being directed to a reference chamber 23 containing a liquid of known characteristics (hereinafter called the reference liquid). After impingement on the liquid sample and on the reference liquid, the bursts are received by photoresistive cells 25 and 27, respectively. The recovery time of each of the photoresistive cells 25 and 27 is greater than the period between impingement of successive bursts on the liquid sample, i.e., during the interval between bursts the resistance of the cell does not change appreciably. The resistances of the photoresistive cells are compared in a comparison circuit 29 to provide a signal which is proportional to the difference in their resistances and which is correlative with the composition of the liquid sample. The signal may be fed to recording means 31 for preserving the information.

More particularly, and with reference to FIGS. 2 and 3, the illustrated embodiment of the present invention further comprises a pump 33 which conducts the mixture of gases through the scrubber 11. The intake of the pump 33 is in fluid communication with the scrubber 11 through a valve 35, and suitable adjustment of the opening of the valve 35 determines the rate at which the gas mixture passes through the scrubber. This rate is indicated by a flow meter 37. Flow of the gas mixture, as indicated by the arrows in FIGS. 2 and 3, proceeds into and through the flow meter 37, and into the housing 13 of the scrubber 11 at one end thereof. The gas mixture proceeds through the interior of the housing to a point adjacent the opposite end of the scrubber 11, and thence outwardly from the scrubber and through the valve 35 and the pump 33 from which it is exhausted to the atmosphere.

The system further includes a scrubbing liquid reservoir 39, which is in fluid communication with the scrubber 11 through a valve 41 (FIG. 3). The scrubbing liquid is a liquid in which the component gas to be analyzed is absorbable, and is conducted to the scrubber either by gravity or otherwise, at a preselected rate which is obtained by suitable adjustment of valve 41. The scrubbing liquid is introduced into the bottom of the housing 13 of the scrubber 11 adjacent one end thereof, and flows along the bottom of the housing to a point adjacent the other end where it is discharged. In the illustrated embodiment, the direction of the flow of the gas mixture through the scrubber is opposite the direction of the flow of the scrubbing liquid, to thereby provide counter-current operation. It should be understood that while counter-current operation is preferably in most circumstances and provides most efficient removal of the component gas from the gas mixture, it may be desirable to provide concurrent flow, i.e., both scrubbing liquid and gas flowing in the same direction, in certain situations.

The scrubber 11 further comprises a motor 43 which drives the rotor 15 through a magnetic coupling comprising a magnet 45 attached to the shaft of the motor 43, and a magnet 47 attached to the rotor 15. Rotation of the rotor 15 and the discs 17 by the motor 43 causes the discs 17, which dip into the scrubbing liquid at the bottom of the housing 13, to continuously form and lift a film of the scrubbing liquid into the path of the mixture of gases flowing through the housing. The structure and mode of operation of the scrubber 11, which will be more particularly described hereinafter with reference to FIGS. 2 and 3, is an important feature, and effects removal of the component gas from the gas mixture and its dissolution into the scrubbing liquid with a surprising and unexpected efficiency and effectiveness.

The liquid sample, comprising the component gas dissolved in the scrubbing liquid is discharged from the housing 13 through conduit 45 to seal leg 47. The seal leg 47 prevents flow of the mixture of gases through the conduit 45.

In the illustrated embodiment, a liquid reagent is added to the liquid sample after its discharge from the scrubber 11. In the analysis of particular component gases in the liquid sample by colorimetric methods, it is sometimes necessary to add a reagent to develop the characteristic color. Reaction of the reagent with the component gas (dissolved in the liquid sample) provides the characteristic color, and such a two-liquid system is shown in the illustrated embodiment. It should, however, be understood that a single-liquid system may also be utilized, in which the scrubbing liquid also includes the reagent which develops the characteristic color, and modification of the illustrated system for a single-liquid determination is obvious to those skilled in the art.

Liquid reagent for admixture with the liquid sample in the seal leg 47 is supplied from a reagent reservoir 49. The rate of flow of the liquid reagent from the reservoir 49 is controllable by suitable adjustment of the opening of a valve 51. Flow of the liquid reagent from the valve 51 proceeds in the direction of the arrows to and through the reference chamber 23, the operation of which will subsequently be described, and thence to the seal leg 47.

From the seal leg 47, the liquid sample, together with the liquid reagent, is conducted to a time delay coil 53. The time delay coil 53 provides sufficient holdup to permit reaction of the liquid reagent with the component gas in the liquid sample to reach equilibrium conditions. The time delay coil may also include restricted orifices or protuberances on the inside of the coil to promote turbulence and a consequent intimate mixture of the reactants. The time required for the liquid sample to traverse the time delay coil is known and preselected, so that an accurate correlation of the time of sampling of the gas mixture can be obtained.

From the time delay coil 53, the liquid sample is conducted to the test chamber 21. The test chamber 21, which is more particularly illustrated in FIGS. 6 and 7 of the drawing, has a structure which minimizes intermixture of the liquid sample with liquid which has previously been introduced thereto. This will also be particularly described hereinafter.

The comparison system 19 further comprises a wave source 55, e.g., in the illustrated embodiment, an incandescent lamp. The beam from the wave source is passed through a collimating lens 57, and a filter 58 from which the beam is directed to a beam splitter 59. The beam splitter 59 is a mirror having reflective surfaces on both sides and which is rotated about its center by suitable driving means (not illustrated). The beam splitter 59 thereby directs the beam alternately to the test chamber 21 and the reference chamber 23, respectively. The test chamber and reference chambers are made of a material which permits most of the energy of the bursts to pass through it, e.g., glass. In the illustrated embodiment, the bursts are also transmitted through the respective liquids and thence to the photoresistive cells 25 and 27, respectively. In passing through the test chambers, the bursts are modified by the characteristics of the liquid contained therein, e.g., by the intensity of the color of the liquids. It should be understood, however, that reflective methods may also be utilized.

The modified bursts are received by photoresistive cells 25 and 27, which respond to the bursts by undergoing a change in electrical resistance which is proportional to the characteristics of the liquid contained in the test chamber 21 and the reference chamber 23, respectively. There is an interval of time between impingement of successive bursts on the cell 25, and the same interval of time between impingement of successive bursts on the cell 27. This interval is determined by the speed of rotation of the mirror of the beam splitter 59, and is equal to one half the period of the beam splitter 59; i.e., one half of the time required for the beam splitter to make one revolution.

The "recovery time" of each of the cells 25 and 27 is chosen so that it is greater than the interval between impingement of successive bursts on each cell. The recovery time of a cell is that length of time required for the cell to return to its unexcited state after impingement of a burst on it. By selecting a cell having a recovery time greater than the interval between successive burst impingements, the cell "sees" continuously, much as the human eye sees a continuous movement in a motion picture because the recovery time of the eye is greater than the interval between the projection of successive images on the screen. As a consequence, the electrical resistance of each of the cells 25 and 27 is substantially steady, i.e., nonpulsating, despite the pulsating light signal which it receives.

These respective resistances comprise part of the comparison circuit 29, which may be of the Wheatstone bridge type of circuit, and the signal from the comparison circuit, which is indicative of the concentration of the component gas in the liquid sample, and threfore indicative of the concentration of the component gas in the sample of air, is fed to the recorder 31 for permanent recording, correlated with time of sampling.

The described comparison system 19 provides a remarkably stable system, relatively free from drift. The rotating beam splitter 59 eliminates drift caused in prior art systems using twin mirrors by unequal darkening of the reflective surfaces of the mirrors, inasmuch as, in accordance with the present invention, the same beam intensity will be directed to the test chamber and the reference chamber irrespective of changes in mirror reflectivity. The only drift which can occur in the present system is that caused by unequal changes in the response characteristics of the photocells 25 and 27. Such changes which occur upon aging of the cells are, however, minimal if the cells are of the same grade and quality, are installed at the same time, and removed at the same time, so that aging proceeds substantially equally in both. Furthermore, such response changes normally take place much more slowly than, for example, changes in the reflectivity of two mirrors which are exposed to varying conditions of corrosion, and which have inherent differences in corrosion susceptibility.

Now considering more particularly the construction of the scrubber 11, and with reference to FIG. 4 of the drawing, it will be seen that the housing 13 is generally tubular, and the rotor 15 is disposed centrally therein. The housing 13 is disposed generally horizontally, although slight deviations from horizontal may also provide satisfactory results. In the illustrated embodiment, a plurality of discs 17 are fixed radially to the axle 65 of the rotor, but it should be understood that in particular circumstances a single disc may afford sufficient transfer surface for satisfactory results.

The axle 65 is journaled in a bearing 67 adjacent one end of the housing 13, and another bearing 69 adjacent the other end. Bearing 67 is retained in a recess in a plug 68, and bearing 69 is retained in an aperture in a support ring 70. Bearings 67 and 69 are preferably made of a material having a low coefficient of friction so that the bearing surfaces are self-lubricating, as far as possible. In a particular construction of the scrubber 11, wherein the material of the axle 65 comprised a polymethacrylate resin, preferred operation was obtained using bearings made from polytetrafluoroethylene resin, one such resin being sold under the trade name Teflon. A particular advantage enjoyed with the polytetrafluoroethylene bearing is the nonwettability of its surface, which inhibits liquid from "crawling" up its surface, and thereby inhibits passage of liquid outwardly from the interior of the housing between the axle 65 and the bearing 69.

The scrubber 11 further comprises a collar 71 and a cap 73 which together define an enclosure around the end of the axle 65 extending through the bearing 69. As previously indicated, the magnet 47 is attached to the axle 65, and together with the magnet 45 which is attached to the shaft of the motor 43 (FIG. 3), comprise the magnetic coupling by which the rotor is driven. A thrust bearing 75 is provided in a recess in the cap 73, against which the magnet 47 bears. The thrust bearing 75 opposes the lateral forces exerted on the magnet 47 by the motor magnet 45. It also is preferably made from polytetrafluoroethylene resin because of its low-friction surface. The face of the thrust bearing 75 adjacent the magnet 47 is preferably conical, with the point of the cone in contact with the magnet so that a minimum bearing area is provided. A drain tube 77 is provided at the bottom of the collar 71 to carry away any liquid which may enter the enclosure through the space between the bearing 69 and the shaft 65. However, as previously indicated, liquid seepage into the enclosure is minimized by the nonwettability of the material of the bearing 69.

The support ring 70 and bearing 69 provide a substantially fluid-tight seal at one end of the housing, and the plug 79 seals the opposite end of the housing 13. A substantially fluid-tight region is thereby provided bounded by the housing 13, the plug 79, the bearing support 70, and the bearing 69.

Gas inlet and outlet conduits 81 and 83 are provided in the top of the housing 13. In the particular embodiment illustrated in FIGS. 3 and 4, the inlet conduit is conduit 81 and the outlet conduit is conduit 83, but, as previously indicated, gas flow through the scrubber 11 may be in either direction so that the inlet and outlet are interchangeable.

Liquid inlet and outlet conduits 85 and 87 are also provided in the bottom of the housing 13 and, in the illustrated embodiment, conduit 85 is the liquid inlet although these also are interchangeable. The illustrated liquid outlet conduit 87 is shown as being flush with the inside wall of the housing 13. In certain applications, however, the outlet conduit may extend further into the interior of the housing than the wall to thereby provide means for maintaining a higher liquid level therein.

As shown particularly in FIG. 5, the scrubbing liquid is maintained at a lever high enough so that the discs 17 dip into the liquid at the bottom of the housing 13. An illustrated level is indicated by the broken line in FIG. 5. The discs 17 have a diameter only slightly less than the interior diameter of the housing 13, to thereby provide a restricted passageway for the scrubbing liquid and the gas mixture to flow therebetween. Preferably, the faces and edges of the discs 17 are roughened, as by abrasion with sand paper or the like, to improve the wettability of the discs by the liquid. It may also be desirable to provide a groove 89 having a roughened surface at the bottom of the housing 13 to provide a surface which is also preferentially wetted by the scrubbing liquid adjacent the bottom of the housing. This tends to concentrate the main body of the scrubbing liquid at the bottom of the housing, and inhibits filming of the liquid up the walls of the housing due to surface tension.

The described embodiment of the scrubber 11 provides surprisingly efficient and effective removal of a component gas from a gas mixture when the component gas is present at extremely low concentrations. In this connection, liquid-gas contacting devices of the rotating-disc type, similar to the scrubber 11 of the present invention, have been known and used for apparatus for blood oxygenation (commonly known as artificial lung machines). One such machine is disclosed in United States Letters Patent No. 3,211,148. However, in artificial lung machines the gas (oxygen) to be absorbed in the liquid (blood) is present in the gas mixture (air) at relatively high concentration, i.e., about 20 percent by volume, and the purpose of such machines is to saturate the blood and not to remove substantially all of the oxygen from the air. Surprisingly and unexpectedly, is was discovered that the scrubber 11 of the present invention provides excellent results in effecting substantially complete removal of a component gas from a mixture of gases when the component gas is present in concentrations lower than about 1 percent.

Contacting means of the rotating-disc type have also been known and used for stripping a liquid of gas dissolved in it. An example of such apparatus is disclosed in United States Letters Patent No. 3,198,000, and another is reported on in Analytical Chemistry, vol. 34, No. 6 (May 1962). In such stripping apparatus, a liquid containing a dissolved gas is passed through the contactor, and an auxiliary inert or indifferent gas is also passed through the contactor to strip the dissolved gas from the liquid. The cited literature article teaches that, in removing dissolved oxygen from water by passing helium across the water, essentially 100 percent removal of oxygen is effected at flow rates from 10 volumes of helium per volume of water to 1 volume of helium per 2 volumes of water. However, these teachings would indicate that it would not be possible to dissolve a soluble gas in water from a stream of a mixture comprising a large quantity of sparingly soluble (inert) gas. It was therefore surprising and completely unexpected to discover that the scrubber 11 of the present invention provided effective and efficient operation in effecting substantially complete removal of the component gas from the gas mixture, and its dissolution in a scrubbing liquid, even though the gas mixture comprises 99 percent or more of sparingly soluble gas.

As an example of the practice of the present invention and of the surprising and unexpectedly efficient removal of a trace gas from air, the scrubber 11 was used to effect removal of sulphur dioxide present at known concentrations in air, and its dissolution in water. Air with the known level of sulphur dioxide was continuously admitted through the rotameter 37 into the scrubber 11 at a rate of 1000 milliliters per minute by suitable adjustment of the opening of the valve 35. Water, contained in the scrubbing liquid reservoir 39, was also admitted into the scrubber 11 at a rate of 1 milliliter per minute by suitable adjustment of the valve 41. The rotor comprised 26 discs made of polymethylmethacrylate resin having a diameter of 11/16 inch spaced 3/16 inch apart. The inside diameter of the housing 13 was 0.75 inch. The rotor was driven at 240 r.p.m.

It should be pointed out that under these conditions the volumetric flow rate ratio was 1000 parts of air per part of water, a ratio ten times as great as that disclosed in the aforementioned literature article. According to traditional theories, such greater proportions of gas to liquid would make it even more difficult to effect dissolution of the component gas. The following table shows, however, that contrary to the poor results which would be predicted by the literature article, exceptionally good results were obtained.

TABLE I

| Run No. | Concentration of SO₂ in air (p.p.m.) | SO₂ removed from air (percent of original concentration) |
| --- | --- | --- |
| 1 | 0.125 | 94 |
| 2 | 0.25 | 97 |
| 3 | 0.50 | 96 |
| 4 | 1.0 | 96 |
| 5 | 2.0 | 97 |
| 6 | 5.0 | 98 |
| 7 | 10.0 | 99 |
| 8 | 25.0 | 99 |

The foregoing results were obtained, as indicated, using water alone as a scrubbing liquid. The improved operation of a scrubber 11 of the present invention is apparent in view of the fact that scrubbers heretofore known and used for the removal of trace amounts of sulphur dioxide from air have required the use of an aqueous solution of HgCl₄ to effect removal. The HgCl₄ solution forms a complex with sulphur dioxide which has heretofore been required to keep it in solution, and even with this scrubbing liquid the prior art methods and apparatus did not effect as complete removal of sulphur dioxide as that obtained in accordance with the present invention with water alone. For example, recovery of 30 or 40 percent of the sulphur dioxide from air has heretofore been normal.

Still another advantage enjoyed with the scrubber 11 in removing trace amounts of sulphur dioxide from air is the relatively insignificant oxidation of the sulphur dioxide to higher valence states. Such oxidation occurs readily when an aqueous solution of sulphur dioxide is exposed to oxygen, and leads to erroneous results with subsequent analytical procedures. In accordance with the present invention, substantially no oxidation takes place, even though a high proportion of the sulphur dioxide is dissolved in the water and intimately contacted with oxygen of air.

Referring next to FIGS. 6 and 7 of the drawing, illustrated in detail is the test chamber 21 which is set forth in perspective in FIG. 2 and schematically in FIG. 3. The test chamber 21 comprises a tubular sensing leg 91 disposed generally vertically, into which the liquid sample is introduced for exposure to bursts of the beam from the beam splitting means 59. A nozzle 93 is provided in the wall of the sensing leg through which the liquid sample is introduced. Means are provided for maintaining the meniscus 92 of the liquid in the sensing leg at about the level indicated by the dotted line in FIG. 7. In the illustrated apparatus, that level is maintained by an inverted U-shaped overflow leg 94. Fluid communication between the overflow leg 94 and the sensing leg 91 is provided by a ball and socket joint 95, whereby lateral adjustment of the overflow leg 94 can be used to vary the level of the liquid sample in the sensing leg 91.

The nozzle 93 is joined to the sensing leg 91 so as to provide a smooth transition from the interior of the nozzle to the interior of the sensing leg. The juncture of the interior wall of the nozzle 93 with the interior wall of the sensing leg 91 defines a curved shoulder 97. The level of the liquid samples in the sensing leg is maintained not substantially lower than the shoulder 97. As indicated in FIG. 7, the meniscus 92 of the liquid sample in the sensing leg, together with the curved shoulder 97, define substantially continuous curved lines which, as will be subsequently described, enable the liquid sample, upon its introduction through the nozzle 93 into the sensing leg 91, to "float" on the previously-introduced liquid.

It is important that the liquid sample be introduced at a flow rate low enough so that it is in laminar flow and not in turbulent flow through the nozzle 93. If the liquid sample is introduced by laminar flow and if the level of the liquid in the sensing leg 91 is maintained as previously described, intermixing of the liquid sample with the previously-introduced liquid is minimized. The liquid sample flows smoothly onto the previously-introduced liquid, so that as successive liquid samples are introduced and flow downwardly through the sensing leg 91 for exposure to the beam bursts, an accurate indication of the instantaneous concentration of the component gas is obtained.

Although the mechanism of operation of the test chamber 21 to achieve this desired result is not fully understood, and while applicant does not wish to be restricted to any particular theory, it is believed that "floating" of the liquid sample is attained as a result of surface tension forces. In this connection, if the level of the liquid in the sensing leg is maintained not substantially lower than the curved shoulder 97, and if the liquid sample is introduced in laminar flow, a continuous film of liquid is maintained extending from the meniscus 92 over the curved shoulder 97 and into the nozzle 93. The surface tension of this continuous film may inhibit "breakthrough" of the liquid sample into the body of the liquid, and cause it to "float" atop the meniscus.

It should be understood that the level of the liquid in the sensing leg 91 may be somewhat lower than the curve of the shoulder 97, without departing from the substance and spirit of the present invention. In this connection, incremental lowering of the liquid level will result in a certain degree of intermixing of the liquid sample with the body of the liquid, which may be acceptable under certain conditions. However, lowering of the liquid level substantially below the curved shoulder 97 will result in unacceptable intermixing. In a particular example of the test chamber 21 of the present invention, the inside diameter of the nozzle 93 was about 5 mm., and the inside diameter of the sensing leg 91 was about 10 mm. The radius of curvature of the curved shoulder 97 was about 10 mm. The bottom of the meniscus 92 in the sensing leg was about 7 mm. below the bottom of the interior wall of the nozzle 93. The liquid sample was introduced into the sensing leg at a rate of about 2 ml. per minute, which provided laminar flow through the nozzle.

Various features of the invention are set forth in the following claims.

What is claimed is:

1. A system for comparing the physico-chemical characteristics of two fluids, comprising, in combination, a first chamber containing the first fluid, a second chamber containing the second fluid, means generating a beam of wave energy, means causing bursts of the beam to impinge alternately on the first fluid and the second fluid at a preselected frequency, a first photoresistive cell positioned to receive the bursts after impingement on the first fluid, a second photoresistive cell positioned to receive the bursts after impingement on the second fluid, means operatively associated with said first and second photoresistive cells for comparing the resistances of said first and second photoresistive cells, each of said first and second photoresistive cells having a recovery time greater than the interval between impingement of successive bursts on each of the first and second fluids, respectively, so that the electrical resistance of each of said photoelectric cells is substantially nonfluctuating, and means for registering the output from said comparing means to provide an indication of the compared physico-chemical characteristics of the two fluids.

2. A system in accordance with claim 1 in which said means generating a beam of wave energy comprises a source of visible light.

3. A system in accordance with claim 1 in which the means causing bursts of wave energy comprises a rotating mirror.

References Cited

UNITED STATES PATENTS

| | | |
|---|---|---|
| 2,452,122 | 10/1948 | Gumaer. |
| 2,547,212 | 4/1951 | Jamison et al. |
| 3,225,645 | 12/1965 | Baruch et al. |
| 3,236,148 | 2/1966 | Pelavin. |
| 3,440,016 | 4/1969 | Serfass. |

RONALD WIBERT, Primary Examiner

W. A. SKLAR, Assistant Examiner

U.S. Cl. X.R.

250—218; 356—185, 188, 195, 208